3,233,582
Patented Feb. 8, 1966

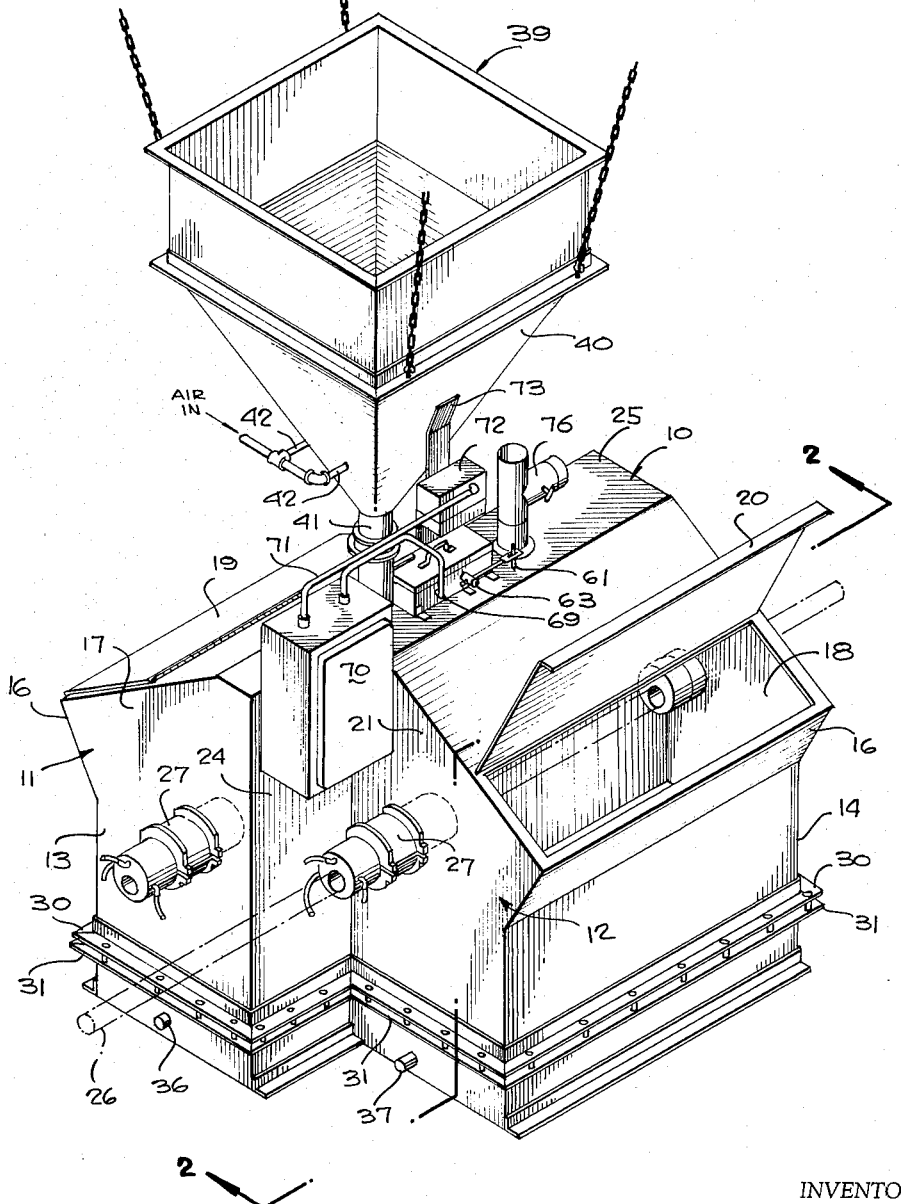

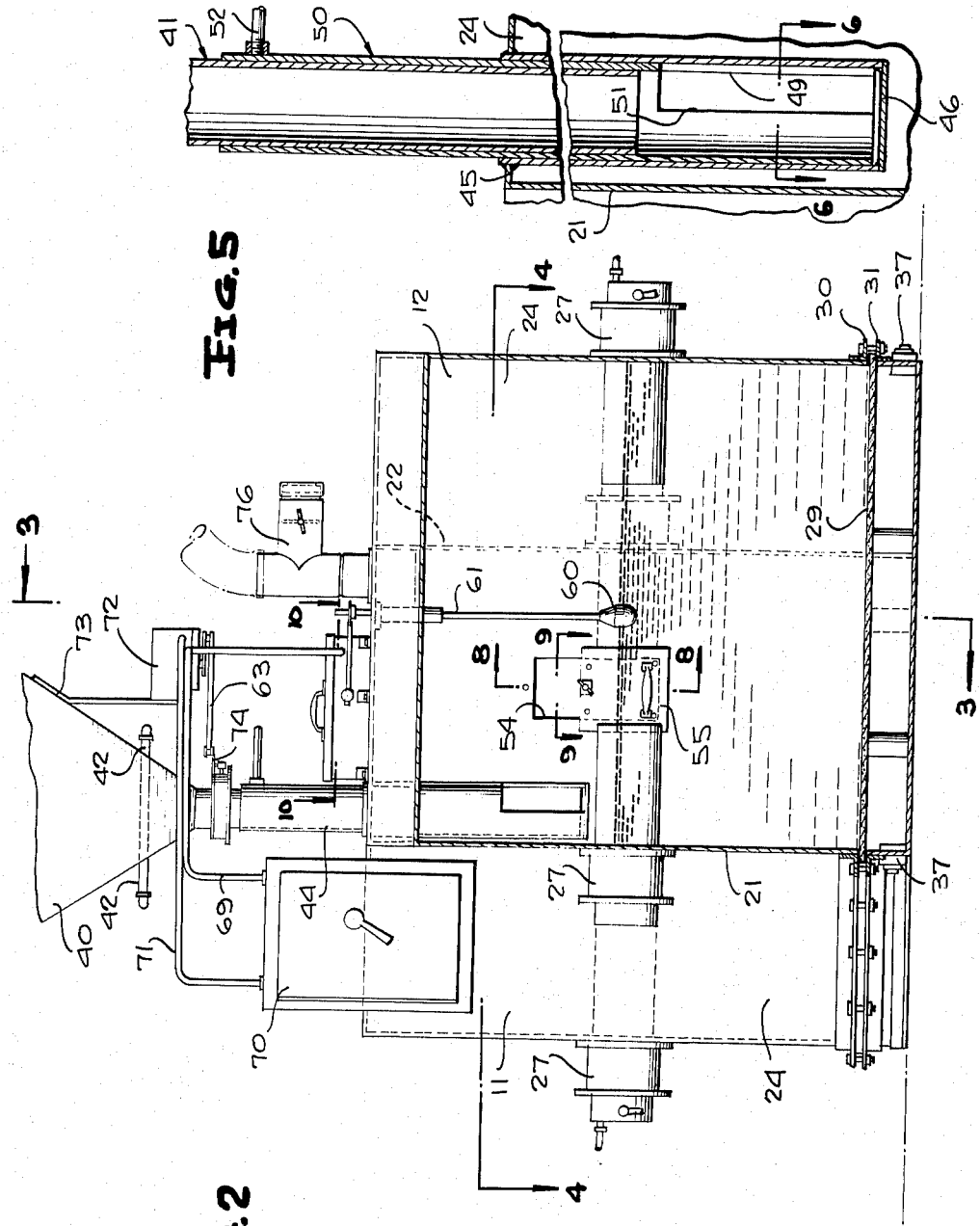

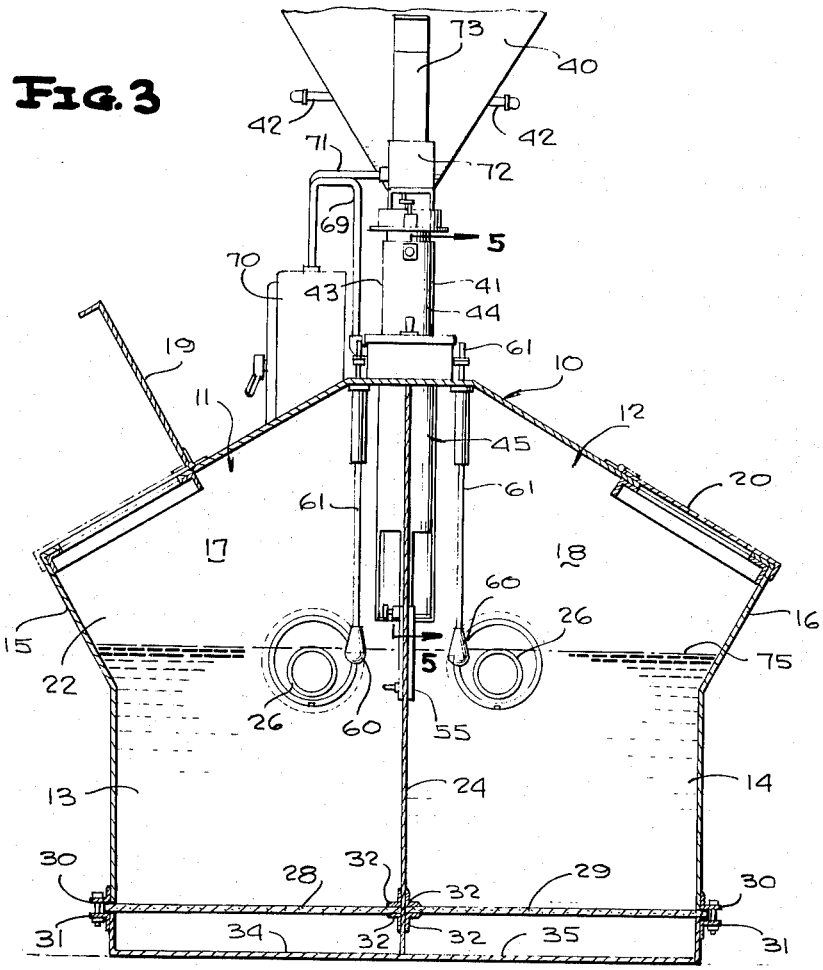
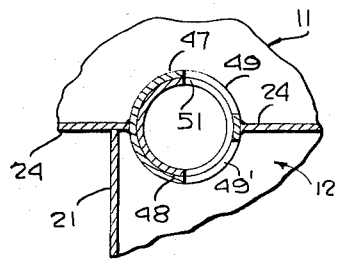
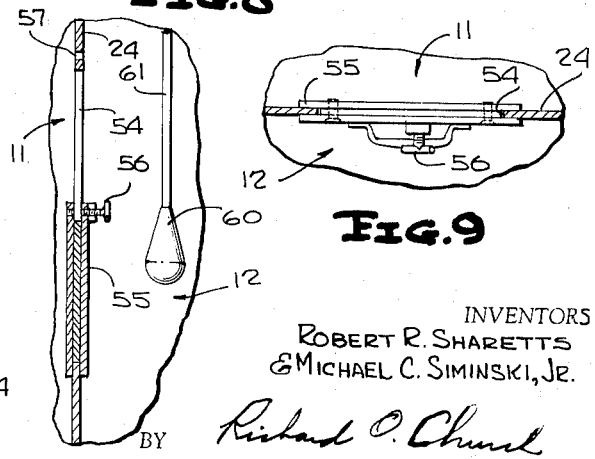
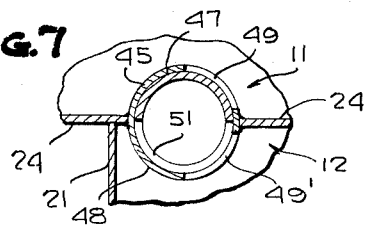

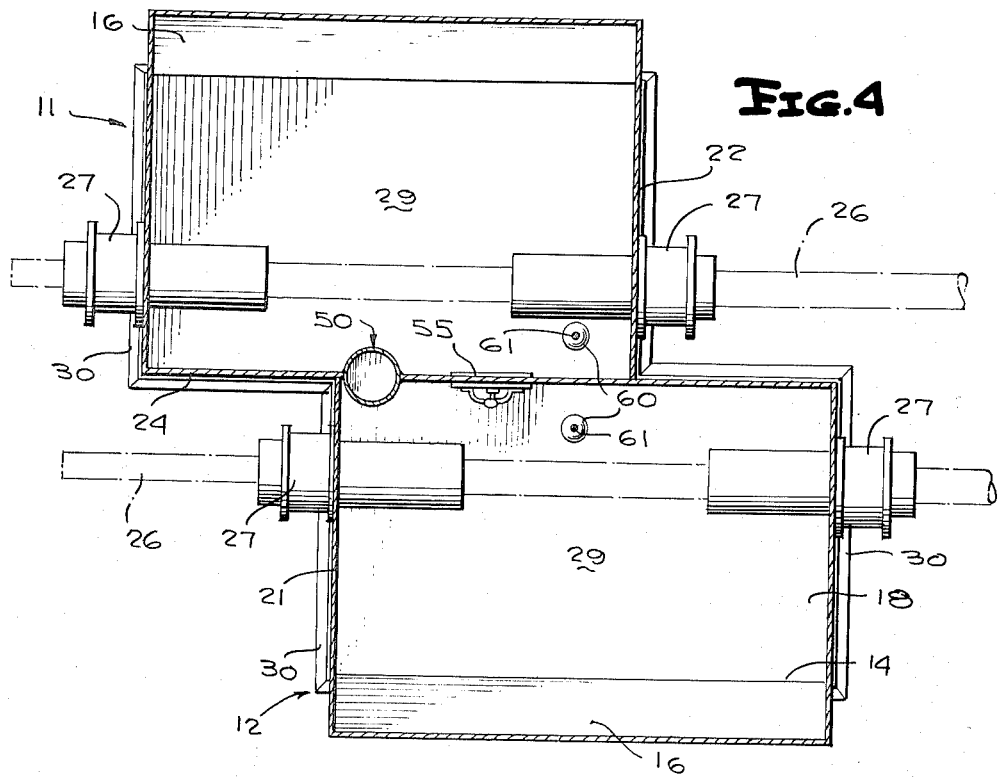
FIG. 4
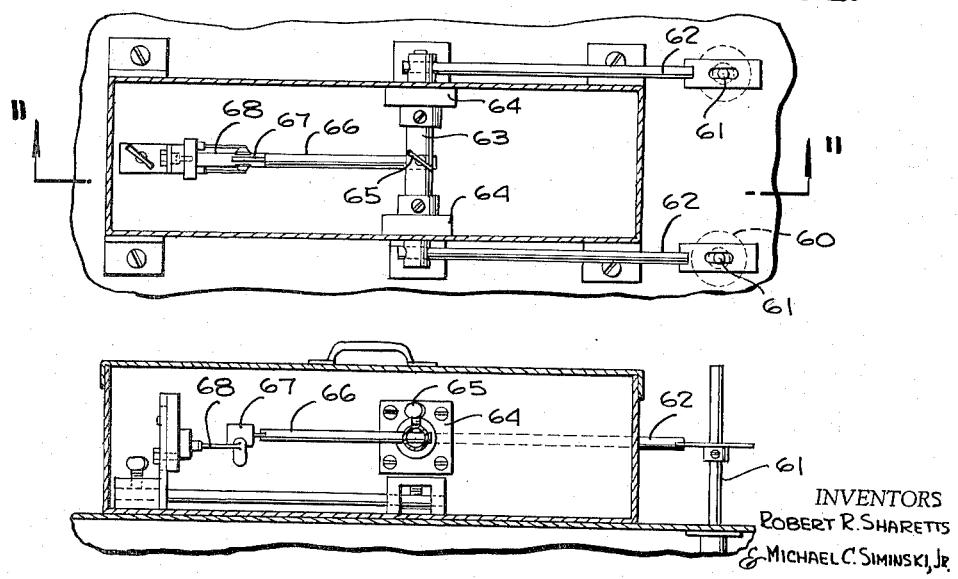
FIG. 10
FIG. 11
INVENTORS
ROBERT R. SHARETTS
& MICHAEL C. SIMINSKI, JR.
BY Richard O. Church
ATTORNEYS though by United States Patent Office

3,233,582
APPARATUS FOR CONTINUOUS FLUIDIZED BED COATING OF PIPE
Robert R. Sharetts, Reading, and Michael C. Siminski, Jr., Sinking Spring, Pa., assignors to The Polymer Corporation, a corporation of Pennsylvania
Filed Jan. 8, 1962, Ser. No. 164,723
5 Claims. (Cl. 118—404)

The present invention relates to apparatus for coating pipe and more particularly to apparatus for coating pipe by a fluidized bed coating process.

The present invention relates to apparatus for coating a pipe by a fluidized bed coating process such as that described in U.S. Patent No. 2,844,489 and in copending patent application S.N. 164,924 filed of even date herewith.

It is an object of the present invention to provide apparatus for coating pipe by a fluidized bed process in which the pipe is continuously fed through openings in the wall of a coating vessel and the pulverized or granular coating material is fed by a feeding system consisting of hopper means, a feed conduit and feed rate control valve, which valve is operatively connected to electronic bed level sensing means to regulate the proper flow rate of pulverized material into the vessel.

It is another object of the present invention to provide novel apparatus for coating a length of pipe with fluidized material in which the material is fed from an elevated hopper means having at its bottom portion an inverted truncated portion that connects directly to the feed conduit.

It is another object of the present invention to provide apparatus for coating a pipe by a fluidized bed process with air jet means in the material feed hopper to fluidize in part the material to prevent it from hanging up in the feed hopper.

It is another object of the present invention to provide a dual tank system in which two pipes of the same size or various sizes may be coated simultaneously by a fluidized bed process.

It is another object of the present invention to provide apparatus for coating a pipe by a fluidized bed coating process having feed conduit means provided with three-way valve means that enables feeding coating powder to either tank or to both tanks simultaneously.

It is another object of the present invention to provide apparatus for coating pipe by a fluidized bed coating process provided with dual tanks having a common division wall with weir means therein so that coating powder may be fed to either tank while the other is out of operation or to both tank simultaneously.

It is another object of the present invention to provide an apparatus for coating pipe having dual coating tanks with weir means disposed therebetween so that the two tanks may be placed in communication with one another to enable the establishment of a uniform level of coating material in both tanks.

It is another object of the present invention to provide apparatus for continuous coating of pipe by a fluidized bed process having a ball float level control means with an upper conical portion of sufficient angularity to exceed the angle of repose of the coating materials so that excess material will not adhere to the upper portion of the ball float and cause irregularities in the feed of material to the coating vessels.

It is still a further object of the present invention to provide apparatus for coating a pipe by a fluidized bed process in which the two tanks have a common wall but are slightly offset with respect to each other, with one tank being slightly forward of the other tank to accommodate certain auxiliary devices, such as skewed rollers and the like required to feed the pipe through the tanks.

Various other objects and advantages of the present invention will be more readily apparent from the following detailed description when considered in connection with the accompanying drawings forming a part thereof, and in which:

FIG. 1 is a perspective view of the pipe coating apparatus of the present invention;

FIG. 2 is a side elevational section partly in section, taken along lines 2—2 of FIG. 1;

FIG. 3 is an end elevational section taken along lines 3—3 of FIG. 2;

FIG. 4 is a bottom or plan section taken along lines 4—4 of FIG. 2;

FIG. 5 is an enlarged detailed view in section, taken along lines 5—5 of FIG. 3 illustrating the three-way valve means embodied in the feed means of the present invention;

FIG. 6 is a transverse section of the valve means of FIG. 5, taken along lines 6—6 of FIG. 5 showing the valve disposed in a position so that powder material is fed simultaneously to both coating tanks;

FIG. 7 is another detailed view of the valve shown in FIG. 6, with the valve disposed so that the powdered material is fed to one tank only;

FIG. 8 is an enlarged detailed fragmentary end view of the weir means embodied in the present invention taken along line 8—8 of FIG. 2;

FIG. 9 is another detailed top view of the weir means of FIG. 8, taken along lines 9—9 of FIG. 2;

FIG. 10 is an enlarged plan view of the electronic bed level sensing device taken along lines 10—10 of FIG. 2; and FIG. 11 is a side elevational view of the electronic bed level sensing device, taken along lines 11—11 of FIG. 10.

Referring to the drawings, the reference numeral 10 generally designates a bed coating apparatus consisting of a first coating tank 11 and a second coating tank 12 disposed adjacent each other. Each tank 11 and 12 consists of a substantially rectangular lower portion 13 and 14 having outwardly inclined upper side walls 15 and 16 respectively, to provide upper bin portions or sections 17 and 18 respectively (see FIGS. 2, 3). Tank 11 is provided with a rectangular hinged door 19 in the top wall thereof extending the full length of the tank, while tank 12 is provided with a similar door 20 for access to the interior of the tanks.

Tank 11 extends or projects forwardly of the front wall 21 of tank 12 (see FIGS. 1, 4), while tank 12 extends a short distance beyond the rear wall 22 of tank 11. The reason for this is to permit auxiliary equipment, not shown in the drawings, which support the pipes as they are coated to be properly accommodated.

The tanks are divided into separate units by a common inner side wall or partition 24 extending between the bottom and top flat wall portion 25 of the tanks. Wall 24 (see FIGS. 1,4) extends forwardly of tank 12 and rearwardly of tank 11 (see FIG. 2).

A pipe 26 to be coated is passed through the front wall of a tank and passes out of the rear wall of the tank as indicated by dot-dash lines in FIG. 1. Cylindrical air seal means 27 for passing the pipe therethrough are provided in the front and rear walls of the tank. The air seal means do not form part of this invention, but are described and claimed in the above mentioned patent application. The bottom of the tanks are provided with porous plates 28 and 29 respectively, supported in angle irons 30 and 31 extending continuously around the outside of the tanks and inner angle irons 32 and 33, respectively. Adjustable bolt members extend between the angle irons so as to rigidly clamp or fix the partitions 28 and 29 therein. The plates 28 and 29 form a double bottom with the bottoms 34 and 35 respectively, of the tanks so that air or gas under pressure can be supplied to the interior of the tanks through air inlet connections 36 and 37. The plates 28 and 29 may be formed of ceramic filter plate or they may be made of a sintered porous metal material and permit the air or gas under pressure to pass through many small closely spaced pores in very minute gas screens so that the air will fluidize the powdered coating material introduced from the powdered material feed system, as hereinafter described.

The feed system comprises a rectangular powdered material hopper 39 disposed above the tanks having its lower end terminating in a truncated prism section 40 through which the powdered material is fed to the feed conduit pipe 41. The truncated section 40 is provided with a plurality of spaced air jets or nozzle connections 42 therein through which air or gas under pressure is supplied to the truncated section to fluidize in part the feed material to prevent the powdered coating material from hanging up in the feed hopper. The lower portion of the cylindrical feed conduit 41 extends through the flat top portion 25 of the tanks and is disposed therein so that it projects into or straddles both sides of dividing partition 24. In other words, the feed conduit 41 extends into the bin portions of the tanks at a point midway between the common side wall so that the opposite halves of the pipe 43 and 44 (see FIG. 3) are disposed in tanks 11 and 12 respectively, in order to be able to supply powdered material to both tanks, or to one tank at a time. The lower end of feed pipe 41 is telescoped into an outer cylindrical sleeve or casing 45 (see FIG. 5) having a closed bottom end 46 and an open top. Sleeve 45 is disposed in partition 24 so that its midpoint is on a center line with partition 24 and its opposite side halves 47 and 48 thereof (see FIG. 6) are disposed in tanks 11 and 12 respectively. The rear of the sleeve 45 is provided with elongated or longitudinally extending slots 49 and 49' respectively (see FIGS. 5, 6 and 7) which form inlet openings or ports for admitting powdered material to tanks 11 and 12 respectively, from the feed hopper.

An inner sleeve 50 (see FIGS. 5, 6 and 7) having a closed bottom is mounted around the lower end of feed conduit 41 and is disposed between the outer periphery of sleeve 41 and the inner periphery of sleeve 45. Sleeve 50 is provided with a longitudinal slot or opening 51 therein of approximately 180° in its bottom. Handle means 52 (see FIG. 5) are disposed in the upper end of the sleeve 50 may be rotated with respect to the inner feed conduit 41 and the outer sleeve or valve casing 45. These sleeve structures form a three-way gate valve so that the sleeve 50 may be rotated into the position shown in FIG. 6 to feed powdered material simultaneously through slot 51 and slots 49 and 49' to tanks 11 and 12, or so that the sleeve valve 50 may be rotated into the position shown in FIG. 7 so that powdered material may be fed to tank 12 only if desired, and so that the valve may be rotated in the opposite direction so that powdered material may be fed to tank 11 only if desired, while tank 12 is out of operation. The inner sleeve 50 may also be rotated so slot 51 is completely out of alignment with slots 49 and 49' to close off supply of material to both tanks.

Partition 24 is provided with a rectangular opening 54 therein (see FIGS. 8 and 9) extending below the normal liquid level line at which the fluidized bed is normally maintained when the apparatus is in operation. A slidable door 55 having a set screw 56 therein is provided for closing off the opening 54 between the tanks 11 and 12 so that there is no communication therebetween. The weir door 55 is shown in FIG. 8 in an open position when tanks 11 and 12 are in communication with one another. In order to close off communication between the tanks it is merely necessary to raise weir plate 55 from the lower position shown in FIG. 8 to a position with the set screw 56 extending through opening 57 disposed in plate 24 just above opening 54.

The feed level regulating or control means of the present invention comprise a ball float 60 with an upper conical portion of sufficient angularity to exceed the angle of repose of the coating material. A ball float is provided for each tank and is connected by an adjustable rod 61 (FIGS. 10, 11) extending through the top of the tanks, to a horizontal link 62, in turn connected to another horizontal rod 63 journalled in spaced trunnions 64. The midpoint of bar 63 is provided with a set screw 65 which in turn holds a bar 66 having an outer free end provided with an inductance plate 67 operatively connected to an inductance coil 68 to vary the voltage in an electronic mechanism. The inductance coil in turn is operatively connected by an electrical conduit means 69 to an electronic sensing mechanism 70 (see FIG. 1) not forming the invention per se. The electronic sensing mechanism 70 may be a controller of the inductance tuned oscillator type as sold, for example, as Series 400 controllers by the Industrial Instrument Division of the Barber-Colman Company of Rockford, Illinois. The electronic sensing mechanism 70 as can be seen in FIGS. 1 and 2 is disposed on the outside of tank 11 adjacent the portion of partition 24 extending forwardly of wall 21 of tank 12. The particular inductance coil and the means for operatively connecting the float valve thereto do not form the invention per se, as such devices are well known in the art.

The electronic sensing mechanism 70 in turn is operatively connected by electrical conduits means 71 (see FIGS. 1 and 2) to a motor 72 supported by a strap 73 fixed to the truncated section 40 of the feed mechanism. The motor is operatively connected by a connecting link 73 (see FIG. 2) to a well known iris valve 74 which in turn increases and decreases the cross-sectional area of the opening or passage in conduit pipe 41 to permit more or less powdered material to pass therethrough to tanks 11 and 12, in response to the action of the ball float 60. When the ball float 60 moves downwardly into the tank because the fluidized bed level decreases below the predetermined level for which the control is set, the ball float 60 will lower and actuate the control rods, the inductance coil, and the electronic mechanism to actuate the motor to open the iris valve 74 so as to supply a greater amount of powdered material to the tank or tanks. Conversely, when the level of the fluidized bed in the tanks increases above the desired predetermined level, the float valve and other parts of the mechanism will be actuated so that the motor will close the iris valve to decrease the supply of coating material to the tanks.

The fluidized bed level as indicated by the reference numeral 75 in FIG. 3 is shown at a level above the upper periphery of the pipe 26 being coated. It will be realized, however, that the fluidized level may vary from the lower periphery to the upper periphery of the article being coated, with a preferred level being generally in the upper one-third of the diameter of the pipe. The reference numeral 76 designates an exhaust conduit means disposed on top of the tank to create negative pressure to assist in maintaining the desired fluidized level and the air seal means. It exhausts into a closed tank or container, not shown, so that the pulverized material can be stored and used again without waste. It communicates with both tanks.

In operation of the apparatus of the present invention, the pipe 26 is passed from the front wall to the rear wall of a tank through air seals 27 and is coated by introducing pulverized material from hopper 39 down through the feed conduit into the interior of the tank or tanks. The coating material is kept in a fluidized state as the pipe is being coated, by air under pressure being introduced through air supply means 36 and 37 passing into the double bottom wall and through partitions 28 and 29 up into the interior of the tank. Before the article is immersed into the fluidized bed, it is preheated to a temperature above the sintering temperature but below the decomposition point of the fluidized material which may be a powdered thermoplastic material. When the preheated pipe is immersed into the fluidized bed by passing through the openings in the opposite ends of the tank and through the air seals 27, the fluidized powder flows into all crevices, channels, grooves and the like so as to contact all parts of the exterior of the pipe and thus adheres to the pipe. The particular process of coating the pipe, including the temperature ranges, the thickness of the coat desired and so on are described in U.S. Patent No. 2,844,489 and do not form part of this invention.

With the present invention, it will thus be apparent that a pipe may be passed coated in one tank only or two pipes may be coated in both tanks having their powdered material supplied from the common hopper 39 by merely maintaining the weir plate 55 in an open position so that the tanks communicate with each other through opening 54 in the common partition 24.

It will also be apparent that the flow of powdered material to tank 11 or 12 may be readily controlled by rotating the three-way gate valve 50 to introduce material into one tank or the other, or both tanks simultaneously.

Also, the fluidized level 75 in either tank or both tanks may be readily controlled by the float valves 60 operatively connected through the hereinbefore described inductance coil, electronic sensing mechanism and electrical motor operatively connected to the iris valve 74, to provide a sensitive regulation of the rate of feed of powdered material introduced into the tanks.

Inasmuch as various changes may be made in the form, location and relative arrangement of the several parts without departing from the essential characteristics of the invention, it will be understood that the invention is not to be limited except by the scope of the appended claims.

We claim:

1. Apparatus for use in coating elongated articles such as pipe and the like comprising two tanks; each tank having two orifice means horizontally disposed on opposite sides of said tanks; vertically disposed partition means separating said tanks; feed means for supplying pulverulent coating materials to said tank means; means for fluidizing coating materials within said tank means; and adjustable weir means mounted integrally with said partition means enabling equalization of the depth of coating materials in said tanks.

2. An apparatus for use in coating pipes and like articles comprising at least two tanks, feed material supply means for supplying powdered material to said tanks, means for fluidizing said material, means for controlling the rate of flow of said material, three-way valve means for selectively controlling the introduction of material into each tank, said tanks having a common wall dividing them, said wall having an opening therein for equalizing the fluidized bed level of material in said tanks, and weir means for closing off said opening.

3. The apparatus of claim 2 wherein said valve means comprises an outer sleeve having an opening therein in communication with both said tanks, and an inner sleeve rotatable with respect to said outer sleeve for closing said sleeve opening completely at one time, and partially at another time to permit communication with only one of said tanks.

4. The valve means of claim 3 wherein said inner and outer sleeves are closed at their bottoms and open at their tops, and said inner sleeve has a cut-out portion adjacent its lower end adapted to be aligned with said outer sleeve opening.

5. The apparatus of claim 2 wherein said weir means comprises a flat plate and screw means for detachably securing it to said common wall.

References Cited by the Examiner

UNITED STATES PATENTS

| | | | |
|---|---|---|---|
| 2,336,533 | 12/1943 | Dilworth | 118 |
| 2,739,567 | 3/1956 | Jones et al. | 118—429 |
| 2,989,777 | 6/1961 | Bailey | 118 |
| 3,019,126 | 1/1962 | Bartholomew | 117—21 X |
| 3,108,022 | 10/1963 | Church | 117—58 |

OTHER REFERENCES

Ruiter, Jr. et al.: Basic Industrial Electronic Controls, N.Y. Holt, Rinehart and Winston, 1961, pages 257–259, TK 7882, C6 R 8 C.2 (Copy in Group 160).

CHARLES A. WILLMUTH, *Primary Examiner.*

RICHARD D. NEVIUS, *Examiner.*